Sept. 6, 1938.   W. TRURNIT   2,129,290
METHOD AND APPARATUS FOR PRODUCING SCREW THREADS
Filed Sept. 19, 1936

Patented Sept. 6, 1938

2,129,290

UNITED STATES PATENT OFFICE

2,129,290

METHOD AND APPARATUS FOR PRODUCING SCREW THREADS

Walter Trurnit, Waldshut, Germany, assignor to firm Friedr. Trurnit, Altena, Germany Application September 19, 1936, Serial No. 101,645

8 Claims. (Cl. 10—10)

This invention relates to a method and a device for making screw threads by cold method by forging by means of hammer jaws movable radially to the blank, and provided with a female screw thread corresponding to the screw thread to be formed. A suitable device for moving the jaws or hammers in radial direction is provided, and is carried out for instance after the manner of the known stretching machines which have jaws radially guided in a rotating disk and moved towards the blank by rollers mounted in the stationary outer ring and projecting radially from this ring. These jaws or hammers knock, when they are passing along the projecting rollers, against dies between which the blank is held. The hammer jaws therefore move as a unit around the blank only when encountering forces are met to effect radial hammering movements thereof. The hammer jaws may further carry out only a radial movement in which case a positive rotation is imparted to the blank. By this operation the thread is not produced by cutting, but by displacing a portion of the material of the shank. In the known hammer forging machines the hammer jaws have a plurality of successive screw threads; the jaws form in closed condition a kind of nut and at the same time hammer on the blank with the entire length of their screw thread and press into the blank the same number of screw turns. The shank material which is thus displaced can only yield in radial direction and thus increase the diameter of the blank. The diameter of the thread of the screw produced in this manner is in any case larger than the initial diameter of the blank. When producing screw threaded wire or screws with continuous screw thread this is of no importance but in the case of screws having a shank partly free from screw thread it is disadvantageous for the diameter of the screw thread to be larger than that of the shank; in many instances, especially in the case of wood screws, this is inadmissible. The known forging process is therefore only suitable for producing continuous screw threads on blanks, but is unsuitable for making threads on headed screws or non-continuous screw threads on screw bolts or screw threads on wood screws. The method according to the invention is intended chiefly for such screws.

The forging of external screw threads by means of radially movable dies from the middle of the shank without increasing the shank diameter with simultaneous stretching of the blank in the direction towards the end of the screw is also known; the blank, however, is then positively guided externally corresponding to the screw thread, with the result that only cylindrical screw threads can be produced, this method being likewise unsuitable for making pointed screws, especially wood screws.

The invention differs from the known method in that the forging of the screw thread commences at the end of the shank of the screw bolt and a screw threaded jaw, which is not radially movable during the forging operation effects the guiding and also the feed of the blank. Owing to the fact that the forging of the thread commences at the end of the blank shank it is possible to allow the displaced material to cause a stretching of the shank towards the screw head and to thus produce a screw thread with a diameter which is the same as that of the smooth shank.

It has, however, been proposed to forge steep pitched spiral grooves commencing at the end in twist drill blanks, but the feed is then effected by a chuck positively guided according to the twist to be produced, said chuck not allowing the shank to stretch in a direction opposite to that of the feed, during the forging of the screw thread. The blank must stretch in the direction of the feed which is impossible when employing forging jaws provided with screw threads. The known device is therefore not suitable for producing screw threads.

Several embodiments of the invention are illustrated by way of example in the accompanying drawing in which—

The method according to the invention is equally suitable for producing the screw threads on screws for metal parts and on wood screws. As the working conditions for wood screws are particularly difficult but fully met by the invention, the production of wood screws will be hereinafter described.

Figure 1:
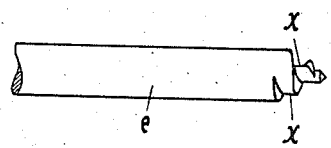
Fig. 1 shows the end of a blank with reduced point.
Figure 2:
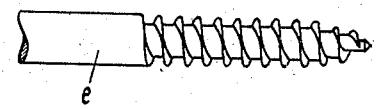
Fig. 2 shows a screw threaded shank forged from the blank shown in Fig. 1.
Figure 3:
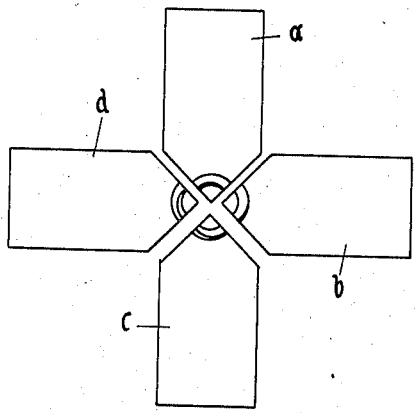
Fig. 3 is an end view of a set of forging jaws in open position.
Figure 4:
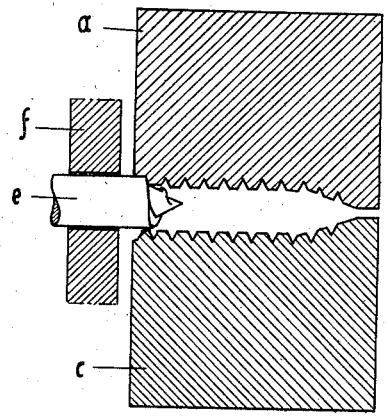
Fig. 4 is a vertical cross sectional view of the open forging jaws shown in Figure 3 and in addition thereto shows in section a guide for the blank.
Figure 5:
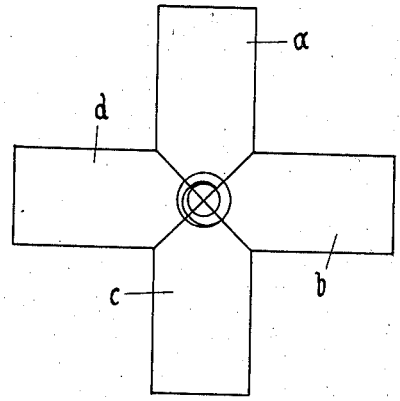
Fig. 5 is a similar view to Fig. 3, showing the jaws in closed condition.
Figure 6:
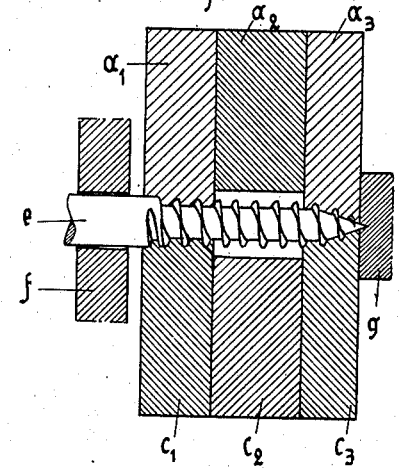
Fig. 6 is a vertical cross sectional view of the forging jaws in closed position as shown in Figure 5 and in addition thereto shows in section a guide for the blank.

Screw blanks can be produced in any known manner, for example in wire pin machines or drop presses, by upsetting the head and cutting the shank to the desired length. By suitably shaping the severing knife a shape can be given to the end of the shank which is approximately similar to that of the point of the finished screw and already represents the commencement of the screw thread as shown in Figs. 1 and 4. In Fig. 1 the point of the shank is for example stepped for a screw point according to Fig. 2, the preliminarily pressed shank point according to Fig. 4 produces a screw point ascending in conical shape as shown in Fig. 6. This rought shaping of the screw point can be completed by giving to the surfaces $x$, which subsequently produce the thread base, an inclination towards the screw head as Fig. 1 shows for the shape of the screw point according to Fig. 2. Owing to this shaping a more perfect shank point is produced by the severing knife in the press in that a certain axial pull on the shank prevents the blank jumping out of the knives before they are completely closed. The same axial pull has subsequently an advantageous effect at the commencement of the screw thread shaping operation hereinafter described, owing to the fact that the prepared thread flank of the blank is held in closest possible contact with the flank of the screw threaded jaw $a$.

The shaping of the shank point can evidently also be carried out in any desired manner in a separate operation independently of the production of the blank, for example in a hollow pointing swage, the only point of importance being that the blank is preliminarily shaped at the end of its shank before the actual production of the screw thread of the screw point and corresponding to the beginning of the screw thread.

In the preliminarily shaped blank with point screw threads are produced in the next following operation. The device for this purpose comprises several, for example four, radially movable jaws or hammers $a$, $b$, $c$, $d$ which are tapered at their inner ends and each constructed to form a point of a swage producing a part of the screw thread. All the component swages form together a matrix which, when in closed position, represents a female screw thread corresponding to the male screw thread to be produced. At least one of the jaws, in the example illustrated the jaw $a$, is checked in its radial movement during the working operation and therefore remains stationary during this time; the remaining jaws are moved in radial direction by some suitable means and exert a blow on the blank introduced between the jaws. The blank $e$ is slidable in a guide $f$ arranged in front of the swage $a$, $b$, $c$, $d$ and held concentrically to the swage and subjected to a yieldable pressure directed towards the swage. When the blank is introduced into the die, its rough shaped screw point bears with its flank corresponding to the screw pitch against the first screw thread turn of the stationary jaw $a$. The first screw thread turn in the swage in closed position is so shaped that it commences as a point in the stationary part $a$, its cross sectional area increasing in the jaws $b$, $c$ and $d$ in wedge-shape and spirally to the full profile and merges into the second turn in the jaw $a$. This first screw thread turn serves for producing the screw thread in that, during the rotation of the blank, it continually presses into the solid blank and thus forms the screw turn in the solid shank. As the external diameter of the female screw thread in the swage corresponds with the diameter of the shank, the material displaced during the forging cannot swell in outward direction but is displaced in the axial direction of the blank towards the screw head, in gradually forming the core of the screw thread. In this manner the shank of the blank is elongated during the hammering of the screw thread; this must be taken into consideration in measuring the length of the blank.

The stationary swage part $a$ effects the guiding of the screw during its formation from the beginning to the end of the operation in such a manner that, when the screw blank is introduced into the swage by the axially directed spring pressure, the screw-shaped preliminarily prepared surface, at the point of the shank bears against the flank of the first screw thread turn portion in the stationary swage part $a$ and, in turning, screws its way along this flank into the working swage in such a manner that the screw thread to be formed immediately receives the proper portion in continuation of the existing point pitch. During the continued rotation of the blank and owing to the concentric guiding of the shank on the stationary swage part the screw thread thus being formed continues to screw its way along the stationary swage part into the swage (Fig. 6) until the preliminarily worked shank point reaches the point of the swage in which the final shaping takes place corresponding to the rough shaping by the gradually increasing radial action of the swage tapering to a point, without causing any detrimental stressing of the material.

In order to obtain a shape of the extreme point without burr in the case of less well shaped blanks, or in order to obtain another shape which is difficult to produce with only radial action of the swage, a tool, for instance an undivided receiving swage $g$ can be arranged on the end of the forging jaws, independently of these, in the direction of the core axis of the screw on the pressing point contacting on this swage and in which the extreme point material is displaced axially under the pressing effect of the following hammer jaws, the displaced material assuming the shape corresponding to the swage. The joint or point of transition between the radially operating jaws and the initial swage can be adapted in a suitable manner to the shape of the point and constructed as radial plane or according to the spiral line of the outermost thread. The tool or initial swage arranged behind the hammer jaws effectively assists the completion of the actual working operation.

The initial swage $g$ can be employed, both in the case of undivided hammer jaws, as shown in Fig. 4, and also in the case of divided hammer jaws as hereinafter described and illustrated in Fig. 6.

As already mentioned, the shaping of the thread is effected by the first thread turn of the swage, the next following thread turns of the swage entering the already formed screw threads and only serve to smooth the thread. The positive guiding of the screw in the stationary swage $a$ causes the hammers to always enter exactly in the preliminarily shaped thread, so that to this latter a continuous smooth surface in the flanks and base is given.

As the work proper of shaping the screw thread is done only by the first thread turn in the hammer jaws and the remaining turns only have to effect smoothing work, it is not necessary for the hammer jaws to be screw threaded along their entire length, a few thread turns at the front end of the hammer jaws being sufficient to completely hammer out the screw thread, the number of turns necessary for forging the thread in the screw point being provided in the rear end of the jaws. The intermediate portion of the hammer jaws can be free from screw thread if the internal diameter is sufficiently large. The hammer jaws are preferably subdivided in their longitudinal direction, as shown in Fig. 6, into three parts $a_1, a_2, a_3$; $b_1, b_2, b_3$; $c_1, c_2, c_3$ and $d_1, d_2, d_3$, the jaw parts are provided with the index "2" being free from screw thread. This subdivision of the jaws offers advantages already in its production, but greater advantages are derived when working with such subdivided jaws because the same set of screw threaded jaws can be employed for different lengths of screw threads of like diameter and with points of like shape, as the total length of the hammer jaws can be adapted to the length of the screw thread actually to be produced by interposing correspondingly long filling pieces without screw thread. The threadless intermediate piece of the hammer jaws may be connected with the threaded jaw parts and move therewith, or they can be immovable in radial direction and form a guide for the movable jaw parts. The subdivision of the jaws offers the additional advantage that only that part of the hammer jaws which forms the screw point need be exchanged when producing screws with differently shaped points but having otherwise the same thread dimensions. It is even possible with the same set of hammer jaws to also produce screws without point, if the part of the hammer jaws forming the point is omitted.

When the desired length of screw thread has been forged, that is if the swage is completely filled by the screws, all the hammer jaws including the stationary jaw $a$, are automatically moved radially outwards so far that they liberate the finished screw which can then be automatically ejected. The automatic opening of the swage can be made dependent upon it being filled by the finished screw in such a manner that by the progressing screw point a mechanically or electrically actuated releasing device is set in operation. Thus, it is ensured that the screw point has been completely forged. The finished screw thread has the same external diameter as the shank and the portion of the shank which has been screw threaded has been elongated in the direction of the core axis.

The method according to the invention enables the formation of cylindrical screws with any type of screw thread, with or without point, that is besides wood screws also iron screws, and also the production of screws with slightly tapered shank. The method also enables the machining of screw blanks, the end of which being preliminarily shaped only to a conical or similar point, if at the commencement of the forging operation to facilitate the thread shaping operation the blank is forcibly screwed in preferably outside the swage, until the stationary jaw $a$ takes over the guiding and feeding.

I claim:

1. A method for the production of screw threads extending along a portion of the length of a screw shank, especially on the shanks of wood screws and other pointed screws, by a cold process in an automatic machine, consisting in moving a plurality of radial thread hammering jaws against a screw shank for hammering screw threads into the shank and effecting elongation of the shank in the direction of its longitudinal axis, beginning the hammering of the screw thread at the end of the shank opposite the head thereof and continuing along a portion of the shank towards the head end thereof, normally retaining one of said jaws from radial hammering activity and guiding said shank centrally of the hammering jaws by said restrained jaw and mutually rotating said jaws and shank to cause the shank to worm its way between the radial jaws and in threaded engagement with the restrained jaw.

2. Method for the production of screw threads extending along a portion of the length of a screw shank, especially on the shank of wood screws and other pointed screws, by a cold process in an automatic machine, consisting in first hammering the end of a shank to produce a partial thread corresponding to the pitch of the thread to be produced on the screw shank, then placing the partially threaded end of the shank into engagement with a radial thread hammering jaw normally restrained from radial movements and constituting a guide for the shank, then moving a plurality of radial thread hammering jaws against the screw shank for hammering screw threads into the shank and effecting elongation of the shank in the direction of its longitudinal axis, and mutually rotating all of said jaws and shank to cause the shank to worm its way between the radial jaws and in threaded engagement with the restrained jaw.

3. Method for the production of screw threads extending along a portion of the length of a screw shank, especially on the shank of wood screws and other pointed screws, by a cold process in an automatic machine, consisting in first forming a thread on one end of the shank by chipless shaping of said shank end to a screw point corresponding to the pitch of the cylindrical screw thread to be produced on the screw shank, then placing the threaded end of the shank in engagement with a radial thread hammering jaw normally restrained from normal movements, then moving a plurality of radial thread hammering jaws against the screw shank for hammering screw threads into the shank and effecting elongation of the shank in a direction of its longitudinal axis and simultaneously utilizing the initial thread formed on the end of the shank as an abutment for correct mergence of the screw thread of the shank end into the screw thread of the shank.

4. Method for the production of screw threads extending along a portion of the length of a screw shank, especially on the shank of wood screws and other pointed screws, by a cold process in an automatic machine, consisting in moving a plurality of radial thread hammering jaws against a screw shank for hammering screw threads into the shank and effecting elongation of the shank in the direction of its longitudinal axis, beginning the hammering of the screw thread at the end of the shank opposite the head thereof and continuing along a portion of the shank towards the head end thereof, normally restraining one of said jaws from radial hammering activity and guiding said shank centrally of the hammering jaws by said restrained jaw and mutually rotating said jaws and shank to cause the shank to worm its way between the radial jaws and in threaded engagement with the restrained jaw and moving the pointed end of the screw shank into engagement with a shaping tool positioned in the path of feeding movement of the screw shank beyond the thread hammering jaws.

5. Apparatus for producing threads along a portion of the screw shanks, especially on the shanks of wood screws and other pointed screws, said apparatus comprising a die composed or relatively radially movable hammer jaws and a co-acting normally stationary radial jaw, all of said jaws converging at their front ends and provided with a part of a female screw thread corresponding to the thread to be produced, said jaws acting to effect elongation of the screw shank during hammering action thereon, all of said jaws forming together a continuous female screw thread, the first turn of which commences at the front extremity of the stationary jaw and merges in wedge shaped cross section into the full profile in one single turn.

6. Apparatus for producing threads along a portion of the screw shanks, especially on the shanks of wood screws and other pointed screws, said apparatus comprising a die composed of relatively radially movable hammer jaws and a coacting normally stationary radial jaw, all of said jaws converging at their front ends and provided with a part of a female screw thread corresponding to the thread to be produced, said jaws acting to effect elongation of the screw shank during hammering action thereon, all of said jaws forming together a continuous female screw thread, the first turn of which commences at the front extremity of the stationary jaw and merges in wedge shaped cross section into the full profile in one single turn, each of said thread producing jaws being composed of several sections and fitting pieces of different sizes interposed between said sections to adapt the jaws for the production of threads of different length but of the same diameters.

7. Apparatus for producing threads along a portion of the screw shanks, especially on the shanks of wood screws and other pointed screws said apparatus comprising a die composed of relatively radially movable hammer jaws and a co-acting normally stationary radial jaw, all of said jaws converging at their front ends and provided with a part of a female screw thread corresponding to the thread to be produced, said jaws acting to effect elongation of the screw shank during hammering action thereon, all of said jaws forming together a continuous female screw thread, the first turn of which commences at the front extremity of the stationary jaw and merges in wedge shaped cross section into the full profile in one single turn, the jaws of said die when in their full closed positions providing an opening at one side thereof for the projection of the smooth part of the screw point and a closed receiving die arranged concentrically in advance of said hammer die for the reception of the projecting end of the screw for shaping the latter therein by the radial action of the hammer jaws.

8. Method for the production of screw threads from a cold blank consisting in automatically feeding the blank under yieldable pressure centrally towards a hammer die, radially hammering a screw thread into the cold blank commencing at the free end of the blank, threading the blank into the die on a stationary radial die jaw during the hammering operation and radially operating all of the jaws of the die after the production of the thread to liberate the finished screw.

WALTER TRURNIT.